United States Patent
Xu

(10) Patent No.: US 8,300,949 B2
(45) Date of Patent: Oct. 30, 2012

(54) EDGE DETECTION TECHNIQUE HAVING IMPROVED FEATURE VISIBILITY

(75) Inventor: Xinyu Xu, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 345 days.

(21) Appl. No.: 12/782,461

(22) Filed: May 18, 2010

(65) Prior Publication Data

US 2011/0286671 A1  Nov. 24, 2011

(51) Int. Cl.
*G06K 9/48* (2006.01)
*G06K 9/40* (2006.01)

(52) U.S. Cl. .......................... 382/199; 382/266

(58) Field of Classification Search ............... 382/199, 382/266
See application file for complete search history.

(56) References Cited

U.S. PATENT DOCUMENTS

| | | | |
|---|---|---|---|
| 5,212,740 A | 5/1993 | Paek et al. | |
| 5,974,197 A * | 10/1999 | Lee et al. | 382/268 |
| 6,167,164 A * | 12/2000 | Lee | 382/261 |
| 6,226,015 B1 | 5/2001 | Danneels | |
| 6,226,050 B1 * | 5/2001 | Lee | 348/607 |
| 6,363,168 B1 * | 3/2002 | Kakuma | 382/151 |
| 6,539,060 B1 * | 3/2003 | Lee et al. | 375/240.29 |
| 6,862,368 B1 | 3/2005 | He et al. | |
| 6,885,771 B2 | 4/2005 | Takahashi | |
| 6,941,016 B1 | 9/2005 | Wagman et al. | |
| 6,992,798 B2 * | 1/2006 | Geurts et al. | 358/3.15 |
| 7,003,161 B2 | 2/2006 | Tessadro | |
| 7,013,047 B2 | 3/2006 | Schmidt | |
| 7,031,525 B2 | 4/2006 | Beardsley | |
| 7,596,243 B2 | 9/2009 | Paniconi | |
| 8,098,334 B2 * | 1/2012 | Huang et al. | 348/625 |
| 2003/0169375 A1 * | 9/2003 | Lin et al. | 348/625 |
| 2010/0135588 A1 * | 6/2010 | Au et al. | 382/243 |

FOREIGN PATENT DOCUMENTS

JP 2005142171 A 6/1993

OTHER PUBLICATIONS

Bill Green "Canny Edge Detection Tutorial" 2002.*
International Search Report dated May 24, 2011, International Application No. PCT/JP2011/059999, filed Apr. 19, 2011, Sharp Kabushiki Kaisha, 6 pgs.

* cited by examiner

*Primary Examiner* — Jingge Wu
*Assistant Examiner* — Utpal Shah
(74) *Attorney, Agent, or Firm* — Chernoff Vilhauer McClung & Stenzel, LLP

(57) ABSTRACT

A method for determining edge features of an image comprising filtering at least a portion of the image to attenuate high frequency signals of the image to an extent greater than low frequency signals of the image. Performing a one-dimensional search in a two different horizontal directions relative to a particular pixel of the image to determine horizontal direction local maximums. Calculating a horizontal gradient based upon the horizontal direction local maximums. Performing a one-dimensional search in a two vertical horizontal directions relative to a particular pixel of the image to determine vertical direction local maximums. Calculating a vertical gradient based upon the vertical direction local maximums. Calculating a gradient for the particular pixel based upon the horizontal gradient and the vertical gradient.

10 Claims, 5 Drawing Sheets

| $Z_1$ | $Z_2$ | $Z_3$ |
|---|---|---|
| $Z_4$ | $Z_5$ | $Z_6$ |
| $Z_7$ | $Z_8$ | $Z_9$ |

FIG. 1A

| -1 | -1 | -1 |
|---|---|---|
| 0 | 0 | 0 |
| 1 | 1 | 1 |

FIG. 1B

| -1 | -2 | -1 |
|---|---|---|
| 0 | 0 | 0 |
| 1 | 2 | 1 |

FIG. 1C

| -1 | 0 |
|---|---|
| 0 | 1 |

FIG. 1D

| 0 | -1 | 0 |
|---|---|---|
| -1 | 4 | -1 |
| 0 | -1 | 0 |

FIG. 1E

EDGE DETECTION TECHNIQUE HAVING IMPROVED FEATURE VISIBILITY

CROSS-REFERENCE TO RELATED APPLICATIONS

Not applicable.

BACKGROUND OF THE INVENTION

The present invention relates generally to an edge detection technique having improved feature visibility.

Different image processing techniques are used for different purposes. In many cases, an image processing technique is used to identify edges (or otherwise gradients) within images (or images of a video). Identified edges within an image may be subsequently used for many different applications. For example, the edge identification may be used for motion estimation, image segmentation, target tracking, etc.

Edge identification may be implemented using the differences between the color values (e.g., the intensity) of the pixels included within a region of the image. The pixel differences may include detecting the positions of abrupt changes in the pixel values, and recognizing such positions as corresponding to the outlines of objects. In many cases a low pass filter is first applied to the image, and then the changes are determined for each of the pixels for which a first derivative of the intensity variation gradient within the image reaches a local maximum and exceeds a predetermined threshold value. Each such determination is assumed to be located on an edge of an object in the image.

Another edge detection technique includes a "zero-crossing", whereby the zero crossings of the second derivative of the gradient are detected to identify the edge locations.

Another edge detection technique includes the use of predetermined shape templates that are compared with the image to identify the approximate positions of objects, with the edge identification technique being applied to the identified objects.

What is desired is a signal processing technique for enhancing the identification of gradients.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 illustrates image masks.

DETAILED DESCRIPTION OF PREFERRED EMBODIMENT

Image gradient (or image derivative) is a fundamental technique used in digital image processing. The image gradient identifies information about discontinuities within the image, and is frequently a prominent feature that immediately grasps the viewer's attention. The image gradient is used in conjunction with many image processing and computer vision techniques including, for example, image segmentation, object recognition, object contour extraction, edge detection, 3D, image up-scaling and interpolation, image deposing, image enhancement, motion estimation, visual target tracking, etc. The image gradient may be built upon an image derivative (or a similar such function). A basic definition of the first-order derivative of a one-dimensional function $f(x)$ may be defined as:

$$\frac{\partial f}{\partial x} = \frac{f(x+1) - f(x)}{(x+1) - x} = f(x+1) - f(x) \quad (1)$$

The notation uses a partial derivative in order to keep the notation the same as when considering an image function of two (or more) variables, $f(x, y)$, which describes partial derivatives along the two (or more) spatial axes.

Similarly, a basic definition of the second order derivative of the one-dimensional function $f(x)$ may be defined as:

$$\frac{\partial^2 f}{\partial x^2} = \frac{f(x+1) + f(x-1) - 2f(x)}{(x+1) - x} = f(x+1) + f(x-1) - 2f(x) \quad (2)$$

Figure 2:
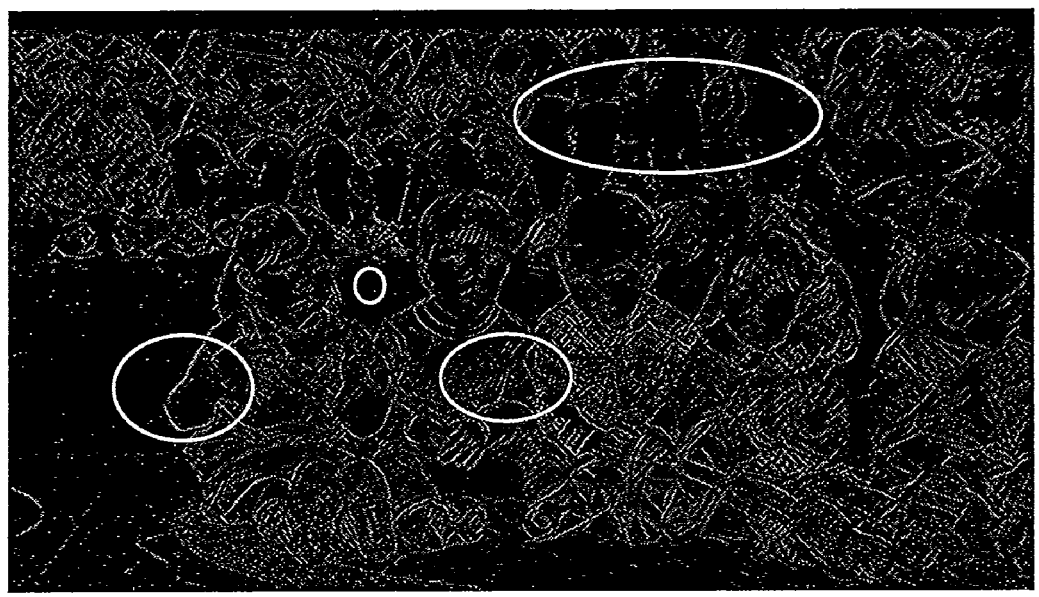
FIG. 2 illustrates image edges with omissions.
Figure 3:
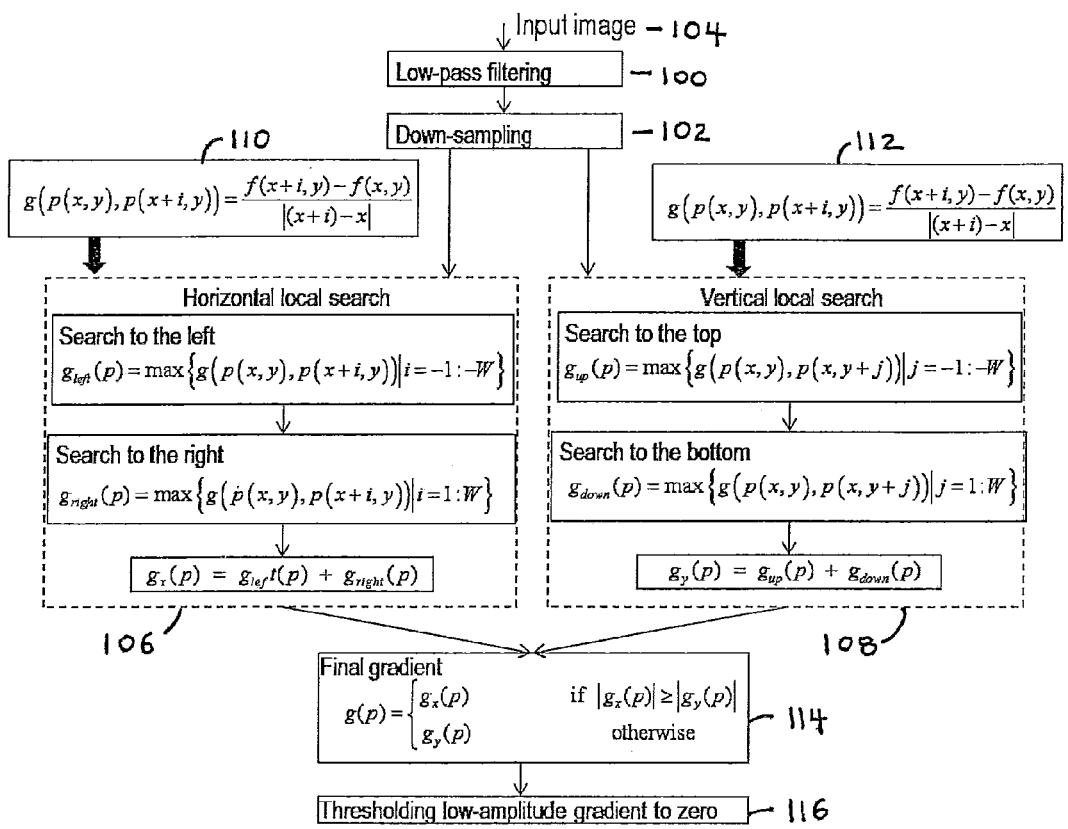
FIG. 3 illustrates a gradient estimation technique.

Several exemplary gradient estimation operators include the Prewitt operator, Sobel operator, Roberts operator, and Laplacian operator. The first three operators are capable of detecting the first-order derivative, and the Laplacian operator is a second-order derivative estimator. The corresponding image processing masks for these operators are shown in FIG. 1. These edge detection/gradient estimation operators can identify the edges of object contours. However, the resulting gradient maps generated by these operators tend to contain many broken edge lines, making the boundary of object structure not well-defined. For many applications, this limitation will be harmful as it will inhibit the viewer from grasping a key feature of the image. Referring to FIG. 2, a gradient map obtained by the Sobel operator results in structures in the circled areas not being well defined.

It was determined that one reason for this structure identification limitation is that these operators employ a small spatial neighborhood for computing the gradients, therefore making it less aware of the existence of pixels in the local neighborhood that have a larger gradient. To reduce this limitation, a modified gradient estimation technique should include a larger spatial support together with determining a local maximum gradient.

A modified gradient technique may include initially low-pass filtering 100 and/or down-sampling 102 of an input image 104. The low-pass filtering 100 and down-sampling 102 reduces power consumption and also suppresses noise in the input image 104, which, if otherwise not modified, would result in erroneous results in subsequent gradient estimation.

For each input pixel p(x, y), along the horizontal axis, the modified image gradient technique performs a 1-dimensional search in two directions 106, towards the left and towards the right of the current point, to determine the local maximum gradient. This may be expressed as:

$$g_{left}(p) = \max\{g(p(x,y), p(x+i,y)) | i = -1 : -W\}$$

$$g_{right}(p) = \max\{g(p(x,y), p(x+i,y)) | i = 1 : W\} \quad (2)$$

W represents the size of search window, which is preferably set to 3.

Along the vertical axis, similarly, the modified image gradient technique performs a 1-dimensional search in two directions 108, above and below the current point, to determine the local maximum gradient. This may be expressed as:

$$g_{up}(p)=\max\{g(p(x,y),p(x,y+j))|j=-1:-W\}$$

$$g_{down}(p)=\max\{g(p(x,y),p(x,y+j))|j=1:W\} \quad (3)$$

The gradient at pixel p(x,y) with respect to p(x+i,y) 110 may be defined as:

$$g(p(x,y), p(x+i,y)) = \frac{f(x+i,y) - f(x,y)}{|(x+i)-x|} \quad (4)$$

The gradient at pixel p(x,y) with respect to p(x,y+j) 112 may be defined as:

$$g(p(x,y), p(x,y+j)) = \frac{f(x,y+j) - f(x,y)}{|(y+j)-y|} \quad (5)$$

Where function $f(x,y)$ is the image intensity at pixel p(x,y). The gradient is generally the intensity difference between point p(x,y) and point p(x+i,y) weighted by their 1-dimensional spatial distance.

On both horizontal axis and vertical axis, the gradients from the two search directions are added 114 to obtain one horizontal and one vertical gradient respectively, as follows:

$$g_x(p)=g_{left}(p)+g_{right}(p)$$

$$g_y(p)=g_{up}(p)+g_{down}(p) \quad (6)$$

The horizontal or vertical gradient, $g_x(p)$ or $g_y(p)$ is generally a second order derivative at pixel p(x,y). The resulting gradient (or the parts thereof) are preferably thresholded 116 in any suitable manner.

The proof for the gradients being a second order derivative is provided as follows (for the simplicity of notation, they coordinates are omitted). Suppose the local maximum gradient to the left of p(x) is $g_{left}(p)=g(p(x), p(x-i))$, i>0, and the local maximum gradient to the right of p(x) is $g_{right}(p)=g(p(x), p(x+j))$, j>0, then $$\begin{aligned}g_x(p) &= g_{left}(p) + g_{right}(p) \quad (7)\\ &= g(p(x), p(x-i)) + g(p(x), p(x+j))\\ &= \frac{f(x-i)-f(x)}{i} + \frac{f(x+j)-f(x)}{j}\\ &= \frac{jf(x-i)+if(x+j)-(i+j)f(x)}{ij}\\ &= \frac{f(x-i)}{i} + \frac{f(x+j)}{j} - \frac{(i+j)f(x)}{ij}\\ &= af(x-i) + bf(x+j) - (a+b)f(x)\end{aligned}$$

Based on the definition of second-order derivative, it may be observed that the technique estimates the second order derivative as the gradient.

The final gradient at pixel p(x, y) is given by the largest of the two gradient:

$$g(p) = \begin{cases} g_x(p) & \text{if } |g_x(p)| \geq |g_y(p)| \\ g_y(p) & \text{otherwise} \end{cases} \quad (8)$$

After the gradient at each pixel is obtained, it is typically thresholded to reduce the low-amplitude gradients from the image. By doing this, the excessive noisy gradients can be removed.

$$g(p) = \begin{cases} g(p), & g(p) > T \\ 0, & \text{otherwise} \end{cases} \quad (9)$$

Figure 4:
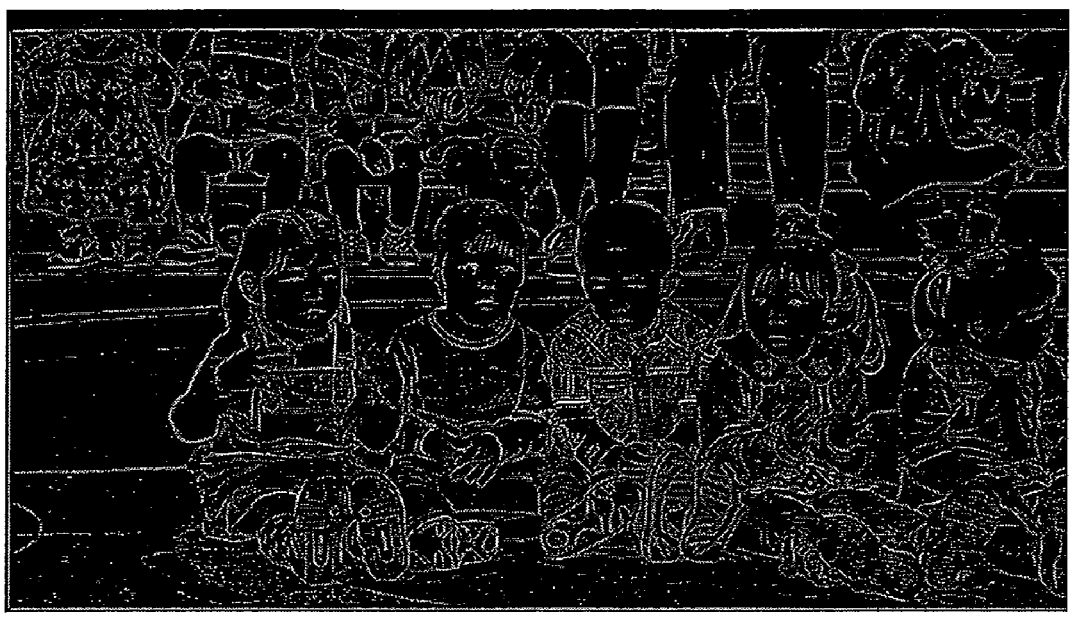
FIG. 4 illustrates image edges with fewer omissions.

Referring to FIG. 4, the modified technique is able to generate well-defined object contours.

Figure 5:
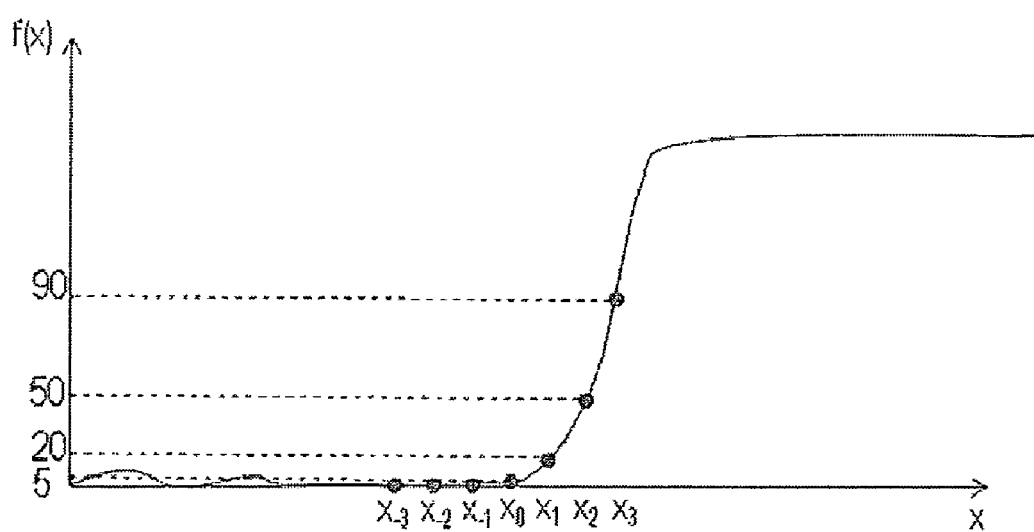
FIG. 5 illustrates an intensity edge in an image.

Referring to FIG. 5, the benefits of the technique are illustrated. $x_0$ is the central pixel, others are the neighborhood pixels. If one applies a 1×3 Laplacian filter to compute the second-order derivative at $x_0$, it will give small gradient:

$$g_{lap}(x_0)=f(x_1)+f(x_{-1})-2f(x_0)\approx 10$$

However, with the described technique, a 1×7 window centered at $x_0$ may be used to compute the local maximum gradient at $x_0$, given by:

$$g_{new}(x_0)=g_{left}(x_0)+g_{right}(x_0)\approx(-5)+30=25$$

Therefore with local maximum gradient search, the described technique is able to reduce those pixels with a small gradient from being detected as edges, and it can detect strong gradient in a local neighborhood which may not be detectable by other techniques. This results in a gradient map that is cleaner and includes more well defined object contours. Also, the larger spatial support in computing the gradients reduces the effects of noise.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for determining edge features of an image comprising:
    (a) filtering at least a portion of said image to attenuate high frequency signals of said image to an extent greater than low frequency signals of said image;
    (b) performing a one-dimensional search in a first horizontal direction relative to a particular pixel of said image to determine a first horizontal direction local maximum;
    (c) performing a one-dimensional search in a second horizontal direction relative to said particular pixel of said image to determine a second horizontal direction local maximum;
    (d) calculating a horizontal gradient based upon said first horizontal direction local maximum and said second horizontal direction local maximum;
    (e) performing a one-dimensional search in a first vertical direction relative to a particular pixel of said image to determine a first vertical direction local maximum;
    (f) performing a one-dimensional search in a second vertical direction relative to said particular pixel of said image to determine a second vertical direction local maximum;
    (g) calculating a vertical gradient based upon said first vertical direction local maximum and said second vertical direction local maximum;
    (h) calculating a gradient for said particular pixel based upon said horizontal gradient and said vertical gradient.

2. The method of claim 1 wherein said first and second horizontal directions are based upon more than 3 pixels.

3. The method of claim 1 wherein said first and second vertical directions are based upon more than 3 pixels.

4. The method of claim 1 wherein said gradient is thresholded.

5. The method of claim 1 wherein said horizontal searches and vertical searches are independent of one another.

6. The method of claim 1 wherein said calculating said horizontal gradient is based upon the summation of said first and second horizontal gradients.

7. The method of claim 1 wherein said calculating said vertical gradient is based upon the summation of said first and second vertical gradients.

8. The method of claim 1 wherein said gradient is based upon the larger of said vertical gradient and said horizontal gradients.

9. The method of claim 1 wherein said calculations are based upon the gray scale of said image.

10. The method of claim 1 further comprising down-sampling said image.

* * * * *